United States Patent Office.

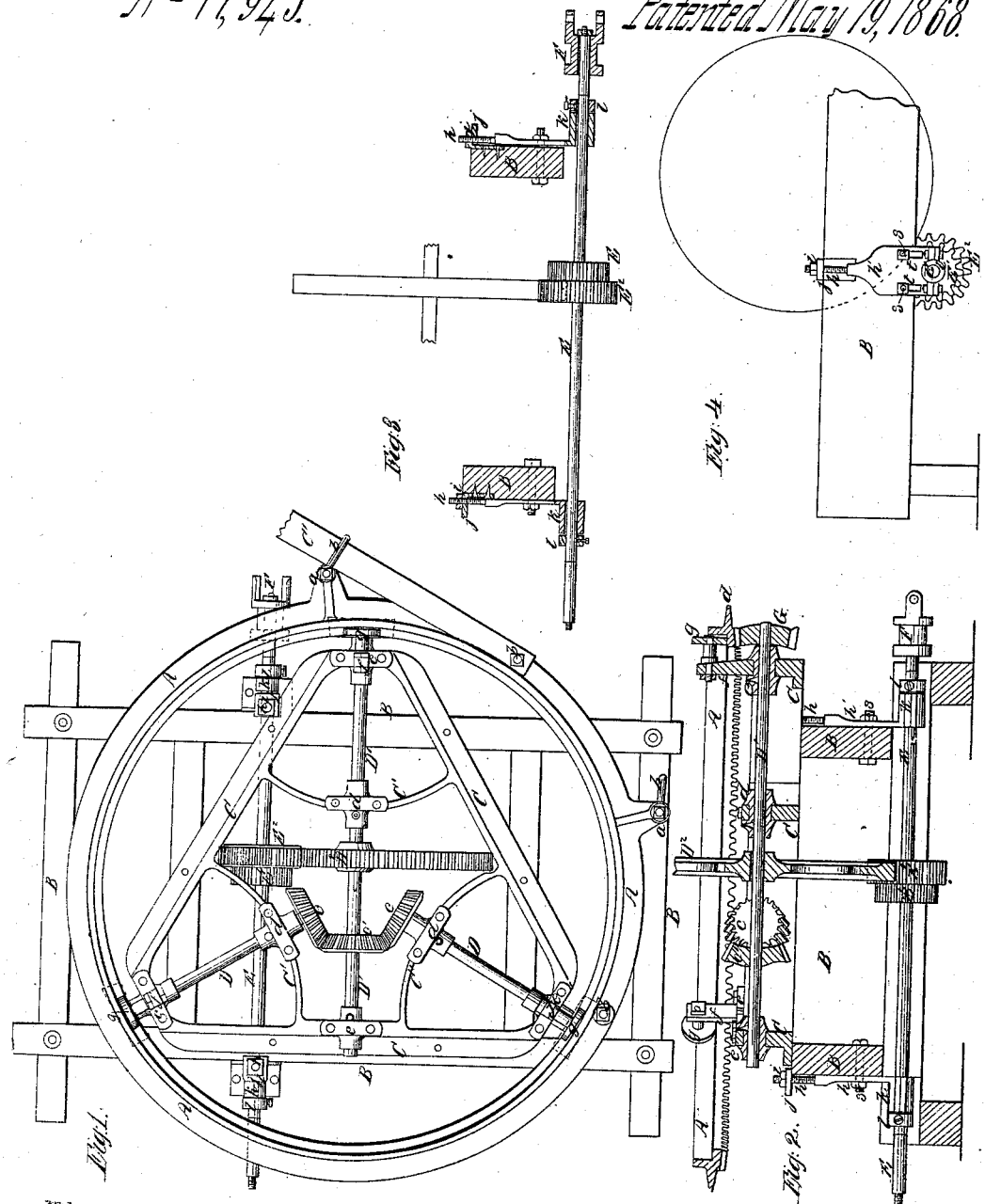

HIRAM ALDRIDGE, OF GOSHEN, INDIANA, AND WILLIS BEDFORD, OF CHICAGO, ILLINOIS, ASSIGNORS TO HIRAM ALDRIDGE.

Letters Patent No. 77,945, dated May 19, 1868.

IMPROVEMENT IN HORSE-POWER.

The Schedule referred to in these Letters Patent and making part of the same.

TO ALL WHOM IT MAY CONCERN:

Be it known that we, HIRAM ALDRIDGE, of Goshen, in the county of Elkhart, and State of Indiana, and WILLIS BEDFORD, of Chicago, in the county of Cook, and State of Illinois, have invented certain new and useful Improvements in Horse-Powers; and we do hereby declare that the following is a full, clear, and exact description thereof, reference being had to the accompanying drawings, making a part of this specification, in which—

Figure 1 is a plan view of our improved horse-power complete.

Figure 2 is a cross-section taken in the vertical plane indicated by red line $x\ x$ in fig. 1.

Figure 3 is a transverse sectional view of the frame, showing the driving-shaft, its two spur-wheels, and the manner of suspending it beneath said frame.

Figure 4 shows one of the adjustable hangers for the driving-shaft.

Similar letters of reference indicate corresponding parts in the several figures.

This invention relates to certain novel improvements on horse-powers, wherein the teams working the powers are hitched to a long sweep or lever, and travel around in a circle. Owing to the fact that a team will sometimes walk slower than at other times, the speed of the power will vary in the same ratio as the variation of walking speed of the teams. Again, it is important to provide for changing the speed of the driving or tumbling-shaft, through which motion is transmitted to threshing and other machinery, so as to adapt the speed of the power to the kind of work to be done. It is also important to have two or more pinions attached to the same driving-shaft, whether these pinions are of the same or different diameters, for the reason that the teeth of the pinion upon such shaft are subjected to great strain and wear, and frequently break; in which case, if one or more supplemental pinions are employed, another can be quickly substituted in its stead.

The nature of our invention consists in providing simple and practical means whereby the driving-shaft, through which motion is transmitted to machinery, can be raised or depressed vertically, and also adjusted longitudinally, said shaft having applied upon it two or more pinion-spur wheels, as will be hereinafter described, whereby different speeds can be given to said shafts and the machinery to which it transmits motion, and whereby a given speed can be maintained whether the team working the power walk fast or slow, as will be hereinafter explained. And, in conjunction with the above features, the invention further consists in providing for effecting the longitudinal adjustment of said shaft and a change from fast to slow speed, or *vice versa*, without changing the relative distance between the horse-power and the machine which it operates, as will be hereinafter explained.

The invention also consists in constructing the main frame of the horse-power of a triangular form, and in distributing three driving-pinions beneath or above a horizontal revolving toothed master-wheel, in such manner as to place each one of said wheels at the angle of said frame, and thus to equalize and distribute the power applied to the master-wheel equally, said master-wheel being constructed in such manner as to admit of the application to it, above the axis of the several pinions, of anti-friction holding-down rollers; and said pinions being applied to shafts which radiate from a common centre, and communicate motion and power uniformly to the main spur-wheel that drives the machinery, all as will be hereinafter described.

To enable others skilled in the art to understand our invention, we will describe its construction and operation.

In the accompanying drawings, B represents the frame or foundation upon which the improved horse-power is applied, which frame may be adapted for being secured permanently down in place, or it may be mounted upon wheels so as to be portable, whenever it is desired to transport it from one place to another. Upon this frame B, a frame, A, is firmly bolted, which, when taken horizontally, is of the form of an equilateral triangle, with the corners cut off as shown in fig. 1. In cross-section, the side-bars forming this frame are L-shaped, so as to leave an outwardly-projecting flanged base, through which to pass bolts for securing the frame in place upon its foundation B. The frame A is cast in one piece, and, at its four angles, recesses are left for receiving journal-boxes, which are held in place by means of caps, which are lettered e. The frame C is also constructed with inside bearings C' C' C', which are of a segmental form, and which are cast with recesses in them for receiving journal-boxes that are held down in place by means of caps d d d. Each journal-box is constructed of two half boxes, fitted together and made with side grooves, so that, when in place in frame B, they cannot be moved endwise out of place.

At the three angles or corners of the frame A, outside thereof, are pinion-spur wheels G G G, applied fast to shafts which radiate from the centre of said frame. Two of said shafts, D D, terminate just inside of two of the inside bearings C' C', and carry on their inner ends bevel-spur wheels c c. These wheels c c both engage with a bevel-spur wheel, c', which is upon a shaft, D', that extends entirely across the frame C, as shown in figs. 1 and 2. The shaft $D^1$ also carries a large spur-wheel, $D^2$, within the space included between the three inside bearings C', which wheel communicates motion to a horizontal transverse driving-shaft, E, arranged beneath the frame B, as shown. The pinion-spur wheels G are frusta of cones whose axes and apices have a common centre, which centre is the axis of motion of a master-wheel A.

The master-wheel A is constructed with ears and loops a b, and also with bolts b', suitably arranged upon its circumference, for attaching the levers or sweeps C' to said wheel. Upon the bottom surface of the master-wheel, teeth are formed which engage with the three pinion-wheels G G G, and rotate them all in the same direction when the master-wheel is revolved.

In order to keep said master-wheel down in place upon its pinions G, the caps e of the three corner bearing-boxes have standards f f f constructed upon them, which standards carry, upon studs secured to their upper ends, the anti-friction holding-down wheels g g g, these wheels being arranged so as to roll upon the upper surface of the wheel A, directly over the axes of the pinion-spur wheels G, will keep this wheel down in place, in gear with these wheels. The perpendicular annular rib upon the upper surface of the master-wheel A, in conjunction with the rollers g, will prevent this wheel from being moved laterally out of its place. It will be seen that the three inside spur-wheels c c c', the three pinion-spur wheels G G G, and the toothed ring or master-wheel A, are all concentric to the centre of the triangular frame C, consequently power and motion will be transmitted uniformly from three equidistant points of the master-wheel to the spur-wheel $D^2$, which transmits motion and power to the driving-shaft E.

The shaft E is supported on both sides of the frame B, by means of journal-boxes k k, upon the lower ends of vertically-adjustable hangers h', so that this shaft can be raised or depressed bodily, and set to run at any desired distance from the wheel $D^2$, according to the diameter of the pinion-spur wheels $E^1$ $E^2$ which it is desired to employ upon said shaft. I have represented two pinions of different diameters upon the shaft E, but, if desirable, more than two pinions may be employed.

The hangers h' may be constructed and applied to the frame B, as shown in figs. 2, 3, and 4. They are secured to the frame B by means of bolts s s passing laterally through the sill-beams of this frame, and through vertical oblong slots t t, made through the hangers, as shown in fig. 4. On the upper ends of the slotted plates h', screws h are formed which pass loosely through ears j, and receive nuts i upon them on top of the ears. When the bolts s s are loosened, the shaft E can be raised or depressed by turning the nuts i.

In order to bring either one of the pinion-spur wheels in the same vertical plane as the driving-wheel $D^2$, it will be necessary to provide for adjusting the shaft E lengthwise, which can be readily done by loosening one or the other of the collars l, which are upon said shaft, and which are used to prevent longitudinal motion thereof when not required, by setting them up close to the boxes k, as shown in figs. 1, 2, and 3.

It is evident that the driving-shaft E could not be shifted in direction with its length without moving either the "power" or the machine which is attached to it, unless some plan were adopted which would compensate for said shifting of the shaft.

This plan consists in the use of the slip or shifting coupling-joint F, which is represented in figs. 1, 2, and 3, upon one of the square ends of the shaft E, and so applied thereupon as to be allowed to slide longitudinally a distance equal to the required longitudinal adjustment of said shaft.

The sliding coupling-joint may be applied either to the driving-shaft of the power, or to the loose tumbling-shaft leading from the power, and forming connections by a number of tumbling-shafts with the machine to be operated.

Having described our invention, what we claim as new, and desire to secure by Letters Patent, is—

1. In combination with a stationary or mounted horse-power, we claim a vertically-adjustable shaft, E, which is provided with two or more pinion-spur wheels, for the purposes and substantially in the manner described.

2. The vertically-adjustable shaft E, with two or more pinions upon it, in combination with sliding or compensating knuckles or couplings F, or their equivalents, substantially as and for the purposes described.

3. In combination with a shaft, E, which is made vertically adjustable, and also longitudinally adjustable, we claim the adjustable collars l l, substantially as described.

4. The triangular L-shaped cast frame C C', constructed substantially as and for the purposes described.

5. The combined arrangement of the driving-pinions G G G, radial shafts D D $D^1$, bevel-wheels c c c' arranged upon a triangular frame, C C', substantially as described.

HIRAM ALDRIDGE,
WILLIS BEDFORD.

Witnesses:
W. A. BAMS,
C. D. HENKEL.